(12) United States Patent
Andre

(10) Patent No.: US 11,325,721 B2
(45) Date of Patent: May 10, 2022

(54) INERTING SYSTEM AND AIRCRAFT AND ASSOCIATED INERTING METHOD

(71) Applicant: DASSAULT AVIATION, Paris (FR)

(72) Inventor: Carole Andre, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 16/929,801

(22) Filed: Jul. 15, 2020

(65) Prior Publication Data
US 2021/0016890 A1 Jan. 21, 2021

(30) Foreign Application Priority Data
Jul. 18, 2019 (FR) ...................................... 19 08122

(51) Int. Cl.
*B01D 53/22* (2006.01)
*B64D 37/32* (2006.01)
*B01D 69/04* (2006.01)
*B01D 69/08* (2006.01)
*B64D 37/02* (2006.01)

(52) U.S. Cl.
CPC ........... *B64D 37/32* (2013.01); *B01D 53/228* (2013.01); *B01D 69/04* (2013.01); *B01D 69/08* (2013.01); *B64D 37/02* (2013.01); *B01D 2053/224* (2013.01)

(58) Field of Classification Search
CPC ...... B01D 69/08; B01D 69/04; B01D 53/228; B01D 2053/224; B64D 37/32; B64D 37/02
See application file for complete search history.

(56) References Cited

U.S. PATENT DOCUMENTS

| 2,671,324 | A | * | 3/1954 | Trumpler | F25J 5/00 62/645 |
| 3,390,541 | A | * | 7/1968 | Johnson | G01S 1/02 62/217 |
| 3,507,146 | A | * | 4/1970 | Campbell | B01L 7/00 73/31.04 |
| 3,546,086 | A | * | 12/1970 | Sayles | G01N 27/4067 204/408 |

(Continued)

FOREIGN PATENT DOCUMENTS

| EP | 0588705 A1 | 3/1994 |
| EP | 2241503 A2 | 10/2010 |
| WO | WO2011005946 A1 | 1/2011 |

OTHER PUBLICATIONS

Search Report for priority application FR 1908122.
Search Report for related application FR 2109143.

*Primary Examiner* — Anthony R Shumate
(74) *Attorney, Agent, or Firm* — Davidson, Davidson & Kappel, LLC

(57) ABSTRACT

An inerting system comprises an air separating device having an enclosure (40) having at least one air inlet (46) and one outlet (48) for oxygen-depleted air. The air separating device (18) is configured to generate, from an air inlet flow coming from the air inlet (46) of the enclosure (40), an outlet flow of oxygen-depleted air and to discharge the outlet flow of oxygen-depleted air through the outlet (48) for oxygen-depleted air. The inerting system (14) comprises a heating system (20), outside the enclosure (40), configured to heat at least one region of the enclosure (40).

20 Claims, 3 Drawing Sheets

(56) References Cited

U.S. PATENT DOCUMENTS

| | | | | |
|---|---|---|---|---|
| 4,230,463 | A | * | 10/1980 | Henis ................. B01D 53/22 |
| | | | | 210/500.23 |
| 5,429,662 | A | | 7/1995 | Fillet |
| 9,930,230 | B2 | * | 3/2018 | Costa ................. G05B 19/401 |
| 2005/0247197 | A1 | * | 11/2005 | Snow .................... A62C 3/06 |
| | | | | 95/138 |
| 2006/0249020 | A1 | * | 11/2006 | Tonkovich ............ B01D 53/04 |
| | | | | 95/115 |
| 2012/0304856 | A1 | * | 12/2012 | Kanetsuki ........... B01D 63/023 |
| | | | | 95/47 |
| 2012/0305712 | A1 | * | 12/2012 | Norton ................. B64D 37/30 |
| | | | | 244/135 R |
| 2016/0107116 | A1 | | 4/2016 | Metrulas |
| 2016/0361684 | A1 | * | 12/2016 | Ranjan ................. B64D 37/32 |
| 2016/0362191 | A1 | * | 12/2016 | Hoffjann ............... B64D 11/02 |
| 2017/0305576 | A1 | | 10/2017 | Al-Yafawi et al. |
| 2020/0114307 | A1 | * | 4/2020 | Tanaka ............... B01D 67/0051 |

* cited by examiner

INERTING SYSTEM AND AIRCRAFT AND ASSOCIATED INERTING METHOD

The present disclosure relates to an inerting system for an aircraft fuel tank comprising an air separating device, the air separating device comprising an enclosure, the enclosure having at least one air inlet and one outlet for oxygen-depleted air, the oxygen-depleted air outlet being intended to be connected to the fuel tank, the air separating device being configured to generate, from an air inlet flow coming from the air inlet of the enclosure, an outlet flow of oxygen-depleted air and to discharge the outlet flow of oxygen-depleted air through the outlet for oxygen-depleted air.

Such an inerting system is intended to reduce the risk of inflammation and/or explosion of the fuel tank, by supplying the tank with oxygen-depleted air. To that end, it typically comprises an air separating device serving to generate oxygen-depleted air from incoming air.

BACKGROUND

This air separating device typically comprises membranes, which are for example permeable to oxygen but not to nitrogen. To increase efficiency, the membranes need incoming air that is regulated in terms of pressure and temperature. It is in particular necessary to operate the membranes in their ideal operating temperature range. Indeed, good temperature maintenance of each membrane increases its oxygen permeability, the filtration efficiency of each membrane being related to its oxygen permeability.

However, the separating device is sensitive to heat losses caused by the environment in which it is installed and which decrease the temperature of the air passing through the membranes.

To curb these losses, it is known to heat the membranes by increasing the air flow at the inlet, the air being regulated around the operating temperature of the membranes. The higher the flow rate passing through the membrane is, the better the heating efficiency is. Indeed, the increase in this flow rate improves the internal convection of the membrane and decreases the impact of heat losses thereof due to the outside heat environment.

However, the air flow rate able to pass through these membranes is limited, thus limiting the quantity of oxygen that can be discharged. For this reason, the increased air flow rate passing through each membrane must be sufficient to ensure a good increase in the permeability thereof, but not too high to guarantee that the quantity of filtered air will make it possible to obtain a good purity of the air flow at the outlet.

Furthermore, the temperature at the inlet of each membrane cannot be increased significantly to curb the effects of heat losses. The fibers contained in the membrane are typically made from polymers and can be damaged if the temperature exceeds a threshold above 100° C.

The incoming air can be taken from the cabin of the aircraft.

Alternatively, it is more common for the incoming air to come from the engine, the incoming air also being called "engine bleed." This "engine bleed" is air already heated by the engine, and its temperature is regulated.

Irrespective of the origin of the incoming air, whether from the engine or the cabin, it is necessary to regulate its pressure and its temperature upstream of the air separating device, so that it is supplied to the separating device at the correct temperature. The problems raised above then apply.

Additionally, in the case where the incoming air comes from the engine, additional problems arise. Indeed, the architectures and technologies currently developed for inerting systems are optimized for specific "engine bleed" consumption flow rates that are not suitable for all aircraft. In particular, they may be too high for some aircraft. Lastly, the inerting system is limited in terms of withdrawal of air flow coming from the engine so as not to penalize the engine thrust.

SUMMARY

The present disclosure therefore aims to provide an inerting system making it possible to improve the oxygen depletion of the air distributed in the fuel tank simply and effectively.

In particular, in the case where the air inlet flow comes from the engine, the present disclosure additionally aims to improve the oxygen depletion of the air distributed in the fuel tank, without needing a significant engine bleed consumption.

To that end, an inerting system of the aforementioned type is provided, wherein the inerting system comprises a heating system, outside the enclosure, configured to heat at least one region of the enclosure.

The inerting system may comprise one or more of the following features, considered alone or according to any technically possible combination:

- the enclosure extends along a longitudinal axis and contains membranes, each membrane having an oxygen permeability and a nitrogen permeability, the oxygen permeability being different from the nitrogen permeability, at least part of one of the membranes being, projected on the longitudinal axis, superimposed on the region of the enclosure able to be heated by the heating system;
- each membrane is a tubular membrane extending along the longitudinal axis of the enclosure and, projected on the longitudinal axis, the region of the enclosure able to be heated by the heating system is superimposed on at least 30% of the length of the membranes, preferably at least 50% of the length of the membranes, advantageously at least 80% of the length of the membranes;
- the enclosure contains membranes, each membrane being having an oxygen permeability and a nitrogen permeability, the oxygen permeability being different from the nitrogen permeability, the membranes having an optimal operating temperature range, the inerting system comprising a processing unit configured to control a heating temperature of the heating system so that the heating temperature is within the optimal operating temperature range;
- the region of the enclosure able to be heated by the heating system extends over at least one zone arranged upstream of the longitudinal middle of the enclosure;
- the region of the enclosure able to be heated by the heating system extends over at least 30% of a circumference of the enclosure, for example at least 50% of the circumference of the enclosure, preferably at least 80% of the circumference of the enclosure, and advantageously over the entire circumference of the enclosure;
- the heating system is an electric system and comprises an electric heating member covering said region of the enclosure, the region of the enclosure able to be heated by the heating system being the region of the enclosure covered by the electric heating member, the electric heating member for example being an electric heating cover;

it comprises an outside temperature sensor, able to measure a temperature of the air outside the enclosure or a temperature of an outer surface of the heating cover, the inerting system also comprising a processing unit, the treatment unit being configured to control a heating temperature and/or an electric power of the heating system as a function of a measurement by the outside temperature sensor;

it comprises an air entry flow rate sensor, able to measure a flow rate of the incoming air flow, the inerting system also comprising a processing unit, the processing unit being configured to control a heating temperature and/or an electric power of the heating system as a function of the flow rate measured by the air entry flow rate sensor;

it comprises an air entry valve able to cut off or allow the incoming air flow and/or an air outlet valve able to cut off or allow the outlet flow of oxygen-depleted air, an outlet temperature sensor able to measure a temperature of the outlet flow of oxygen-depleted air, and a processing unit, the processing unit being configured to cut off the incoming air flow, by means of the air inlet valve, and/or to cut off the outlet flow of oxygen-depleted air, by means of the air outlet valve, if the temperature measured by the outlet temperature sensor is greater than a predetermined maximum alert temperature, and it comprises an outlet temperature sensor able to measure a temperature of the outlet flow of oxygen-depleted air, and a processing unit, the processing unit being configured to cut off the heating of the enclosure by the heating system, if the temperature measured by the outlet temperature sensor is greater than a predetermined maximum alert temperature.

the heating system is an electric system, the inerting system comprising an electrical energy supply device configured to sup.

An aircraft comprising a fuel tank and an inerting system as defined above are also provided, the outlet for oxygen-depleted air of the inerting system being connected to the fuel tank.

The aircraft may comprise the following optional feature: an engine, the air inlet flow coming from the engine.

Additionally, an inerting method is also provided comprising:

providing an inerting system as defined above;
generating, from an air inlet flow coming from the air inlet of the enclosure, an outlet flow of oxygen-depleted air;
heating at least one region of the enclosure using the heating system, the heating being carried out before and/or at the same time as the generating; and
discharging the outlet flow of oxygen-depleted air through the outlet for oxygen-depleted air.

BRIEF DESCRIPTION OF THE DRAWINGS

The present disclosure will be better understood upon reading the following description, provided solely as an example and done in reference to the appended drawings, in which.

DETAILED DESCRIPTION

Figure 1:
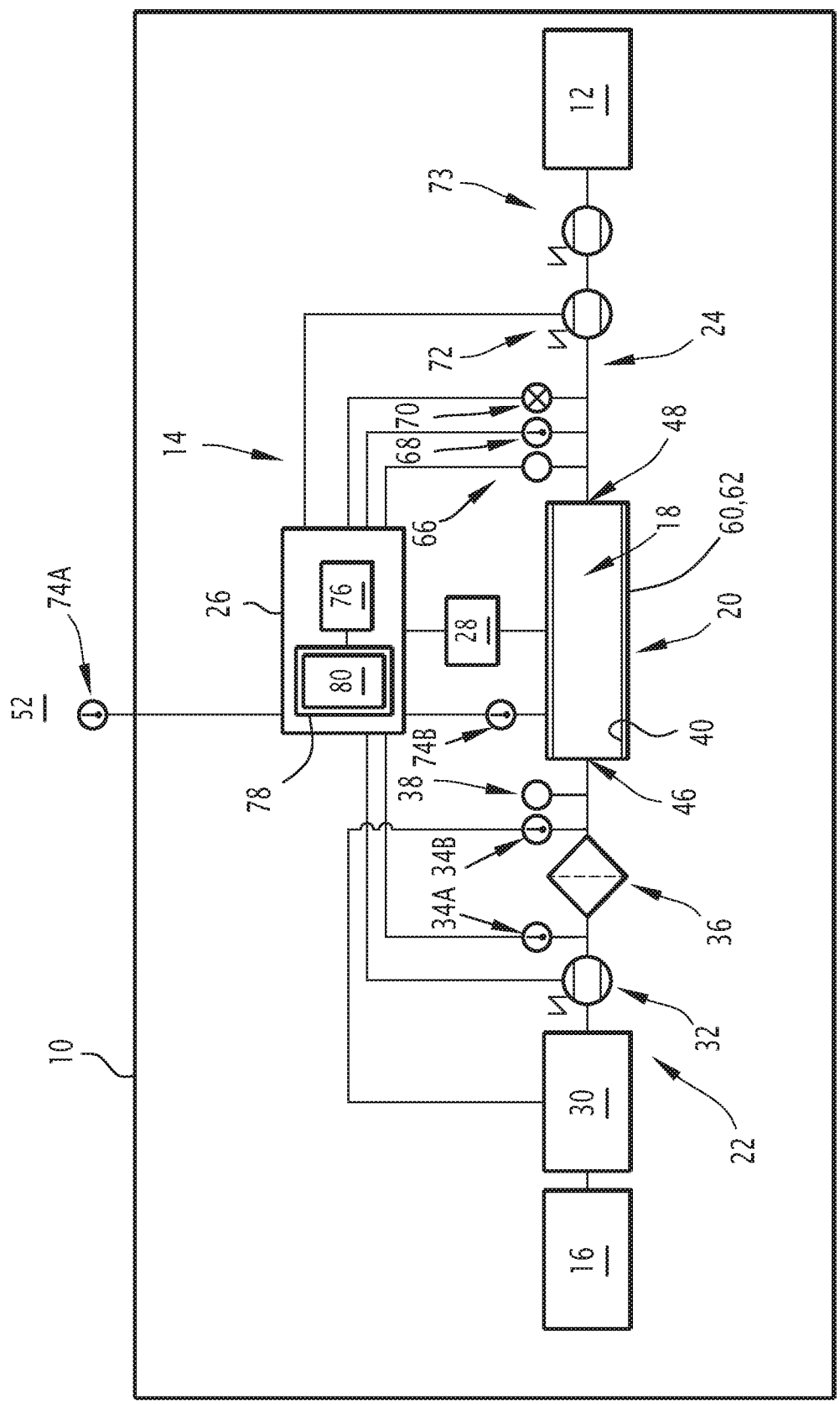
FIG. 1 is a schematic view of a hydraulic diagram of an aircraft comprising an exemplary inerting system.

An aircraft 10 according to the present disclosure is illustrated in FIG. 1.

The aircraft 10 comprises at least one fuel tank 12 and an inerting system 14 for each fuel tank 12.

The aircraft 10 also typically comprises a cabin, not shown, and at least one engine 16.

Each fuel tank 12 contains fuel intended to supply the engine(s) 16.

The fuel is for example kerosene.

The inerting system 14 comprises an air separating device 18, the air separating device 18 being configured to generate, from an air inlet flow, an outlet flow of oxygen-depleted air, and to orient the outlet flow of oxygen-depleted air toward the fuel tank 12.

The inerting system 14 also comprises a heating system 20, as described in more detail hereinafter.

As illustrated in FIG. 1, the inerting system 14 also comprises a procurement chain 22 supplying air inlet flows to the separating device 18 and a discharge chain 24 for the outlet flow of oxygen-depleted air.

The inerting system 14 also comprises a processing unit 26 able to manage the operation of the inerting system 14.

Additionally, the inerting system 14 comprises an electrical energy supply device 28 configured to supply electrical energy to said processing unit 26 and the heating system 20.

The inerting system 14 will be described below from upstream to downstream.

The incoming air flow contains nitrogen and oxygen. The incoming air flow also additionally typically contains rare gases, steam, carbon dioxide and traces of other gases. It contains more than 20 mol % of oxygen.

In the embodiment illustrated in FIG. 1, the incoming air flow at the inlet of the separating device 18 comes from the engine 16. In this case, the incoming air flow is also called "engine bleed."

More specifically, the incoming air flow for example comes from a compression stage of the engine 16 upstream of the combustion chamber.

The inlet air flow procurement chain 22 supplying the separating device 18 thus connects the engine 16 to the separating device 18.

As illustrated in FIG. 1, the procurement chain 22 for example comprises, from upstream to downstream, an air preparation system 30, an air inlet valve 32 an air inlet temperature sensor 34A, a filter 36, another air inlet temperature sensor 34B and an air inlet flow rate sensor 38.

In a variant, the elements 32, 34A, 34B, 36, 38 are placed from upstream to downstream in any order. Additionally, each of these elements can be omitted.

The air preparation system 30 is configured to regulate the temperature and the pressure of the air inlet flow.

In particular, the air preparation system 30 is configured to impose a predetermined temperature and a predetermined pressure on the air inlet flow.

To that end, the air preparation system 30 is connected to the air inlet temperature sensor 34B.

The air inlet valve 32 is able to cut off or allow the air inlet flow.

The air inlet valve 32 is for example a valve of the ON/OFF type.

Each air inlet temperature sensor 34A, 34B is configured to measure a temperature of the air inlet flow at the outlet of the air preparation system 30.

The filter 36 is preferably a particle and liquid filter.

The filter 36 is for example able to implement ozone filtration.

The air inlet flow rate sensor 38 is configured to measure a flow rate of the air inlet flow.

Figure 2:
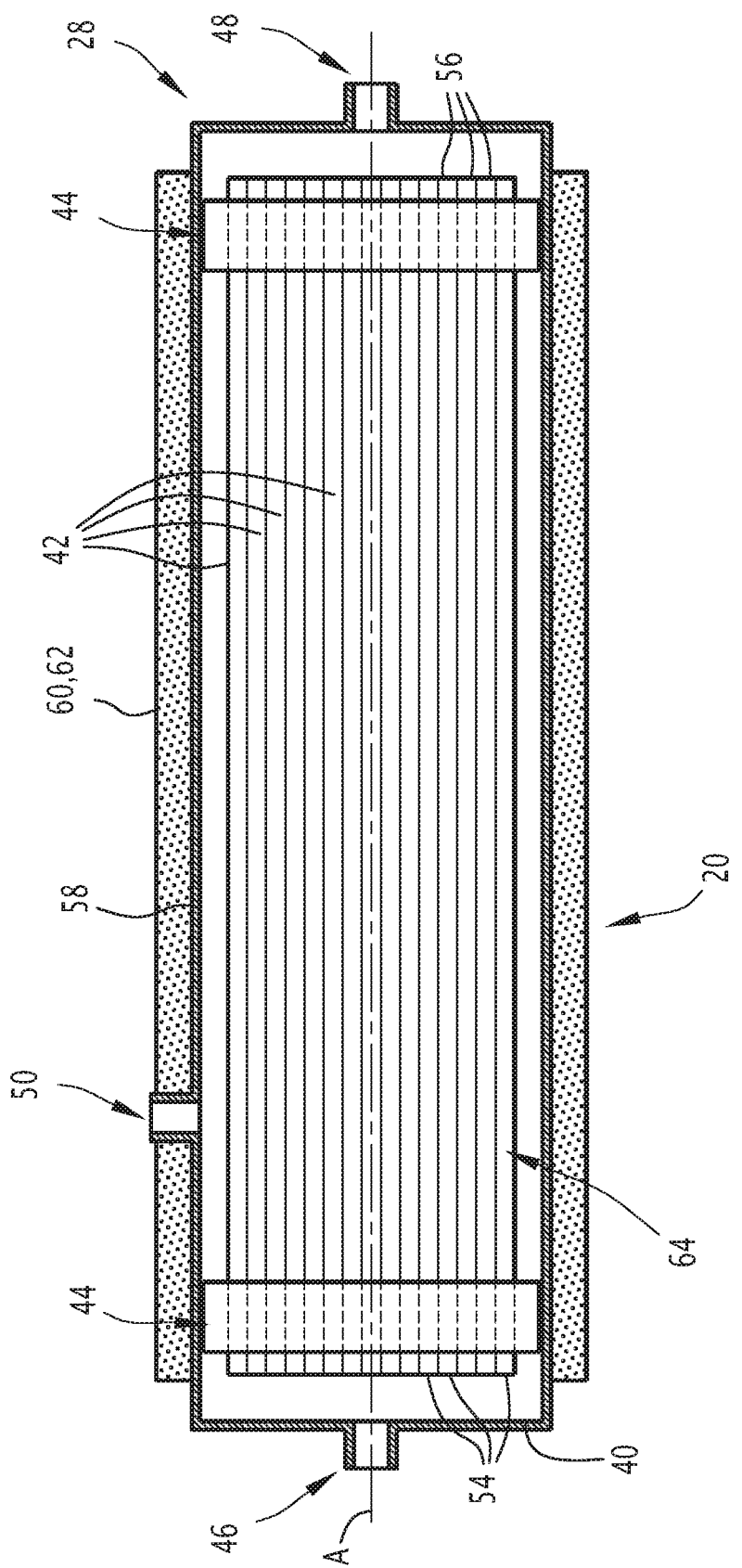
FIG. 2 is a schematic view of a partial longitudinal section of the air separating device of the inerting system of FIG. 1.

The air separating device 18 is illustrated in more detail in FIG. 2.

The air separating device 18 comprises an outer enclosure 40.

The air separating device 18 also advantageously comprises air separating membranes 42, and preferably one or several flanges 44 for fastening the membranes 42 to the enclosure 40.

Preferably, the fastening flanges 44 tightly close the inside of the enclosure 40 to force the air flow through the membranes 42.

The fastening flanges 44 are for example made from epoxy.

The enclosure 40 extends along a longitudinal axis A. It defines an inner volume.

The enclosure 40 has at least one air inlet 46 and an outlet 48 for oxygen-depleted air.

The air inlet 46 is arranged upstream of the outlet 48 for oxygen-depleted air.

During operation, the air inlet flow from which the outlet flow of depleted air is generated passes through the air inlet 46 of the enclosure 40.

Furthermore, during operation, the outlet flow of oxygen-depleted air is discharged through the outlet 48 for oxygen-depleted air.

The enclosure 40 also has an outlet 50 for oxygen-enriched air.

The outlet 50 for oxygen-enriched air is arranged, projected on the longitudinal axis A, between the air inlet 46 and the outlet 48 for oxygen-depleted air.

The outlet 50 for oxygen-enriched air is for example arranged on the circumference of the enclosure 40.

The outlet 50 for oxygen-enriched air is connected to a discharge line, not shown, emerging for example outside 52 the aircraft 10.

The enclosure 40 is for example made from metal.

The enclosure 40 has a cross-section, at the longitudinal axis A, that is for example circular.

The enclosure 40 contains the air separating membranes 42 and the fastening flanges 44.

In particular, the membranes 42 and the fastening flanges 44 are arranged in the inner volume of the enclosure 40.

Each membrane 42 is able to separate the air inlet flow between the outlet flow of oxygen-depleted air and an outlet flow of oxygen-enriched air.

The outlet flow of oxygen-enriched air is in particular discharged through the outlet 50 of oxygen-enriched air of the enclosure 40.

In one exemplary embodiment, each membrane 42 is a tubular membrane extending along the longitudinal axis A of the enclosure 40.

"Extending along the longitudinal axis A of the enclosure" means that each membrane 42 extends along an extension axis, the extension axis and the longitudinal axis defining an angle smaller than 20° relative to one another.

Each membrane 42 extends longitudinally between an upstream end 54 and an opposite downstream end 56.

These upstream 54 and downstream 56 ends are the longitudinal limits of the membrane 42.

Each membrane 42 is open at both of its upstream 54 and downstream 56 ends.

For each membrane 42, the upstream end 54 is arranged substantially across from the air inlet 46 of the enclosure 40, the downstream end 56 being arranged substantially across from the outlet 48 for oxygen-depleted air of the enclosure 40.

The air inlet 46 is arranged, along the longitudinal axis A, upstream from the upstream end 54 of each membrane 42.

The outlet 48 for oxygen-depleted air is arranged, along the longitudinal axis A, downstream from the downstream end of each membrane 42.

Membranes refer to a set of capillaries, also called fibers.

Each membrane 42 defines an inner volume, connecting the two upstream 54 and downstream 56 ends, the inner volume being able to receive the incoming air flow from the air inlet 46 of the enclosure 40.

Each membrane 42 has an oxygen permeability and a nitrogen permeability, the oxygen permeability being different from the nitrogen permeability.

In this embodiment, the oxygen permeability of each membrane 42 is greater than the nitrogen permeability.

For example, the oxygen permeability of each membrane 42 is twice as high as the nitrogen permeability, for example five times higher than the nitrogen permeability, advantageously ten times higher than the nitrogen permeability.

Thus, part of the air inlet flow enters through the upstream end 54 of each membrane 42 and circulates in the inner volume. The oxygen contained in the air inlet flow then passes through the membrane 42. The air flow exiting through the downstream end 56 of each membrane 42 is then depleted in oxygen before being discharged through the outlet 48 for oxygen-depleted air.

The oxygen that passes through the membrane 42 cannot be discharged through the outlet 48. In particular, the outside of each membrane 42 is not connected to the outlet 48.

The outgoing flow of oxygen-depleted air for example comprises an oxygen content of less than 12 mol %.

The membranes 42 have an optimal operating temperature range. This is preferably the temperature range in which the permeability of each membrane 42 to oxygen is the highest.

The optimal temperature range is for example between 65° C. and 100° C.

The heating system 20 is outside the enclosure 40 and is configured to heat at least one region 58 of the enclosure 40.

Advantageously, the heating system 20 is an electric system. It will thus be understood that, in order to heat said region 58 of the enclosure 40, the heating system 20 operates by electricity.

Preferably, the heating system 20 comprises at least one electric heating member 60 covering said region 58 of the enclosure 40.

Thus, "the region of the enclosure able to be heated by the heating system" here and hereinafter refers to the region 58 of the enclosure 40 covered by the electric heating member 60. In particular, it involves the region 58 of the enclosure 40 in line with the electric heating member 60.

The electric heating member 60 for example has an electric power of between 100 W and 7000 W.

The electric heating member 60 is secured to the enclosure 40.

Preferably, the electric heating member 60 is in direct contact with the enclosure 40.

In one exemplary embodiment, the electric heating member 60 is an electric heating cover 62.

The heating cover 62 then for example comprises a plurality of heating resistances arranged between two thermally conductive strips.

The heating resistances are for example supplied with electric energy by said supply device 28.

As illustrated in FIG. 2, the outlet 50 for oxygen-enriched air passes through the heating cover 62.

At least part of one of the membranes 42, advantageously of each membrane 42, is, projected on the longitudinal axis A, superimposed on the region 58 of the enclosure 40 that is able to be heated by the heating system 20.

Said part of the membrane 42 is thus able to be heated by the heating system 20, by means of the heating of the enclosure 40.

It is thus possible to improve the oxygen depletion of the air of the separating device 18, since at least part of each membrane 42 is heated and is therefore less subject to heat losses.

Additionally, preferably, the region 58 of the enclosure 40 able to be heated by the heating system 20 extends over at least one zone 64 arranged upstream of the longitudinal middle of the enclosure 40.

This makes it possible to improve the oxygen depletion of the air of the separating device 18 at low cost.

Furthermore, projected on the longitudinal axis A, the region 58 of the enclosure 40 able to be heated by the heating system 20 is superimposed on at least 30% of the length of the membranes 42, preferably at least 50% of the length of the membranes 42, advantageously. In the example illustrated in FIG. 2, projected on the longitudinal axis A, the region 58 of the enclosure 40 able to be heated by the heating system 20 is superimposed on at least 80% of the length of the membranes 42.

Furthermore, advantageously, the region 58 of the enclosure 40 able to be heated by the heating system 20 extends over at least 30% of a circumference of the enclosure 40, for example at least 50% of the circumference of the enclosure 40, preferably at least 80% of the circumference of the enclosure 40, and advantageously over the entire circumference of the enclosure 40.

In this way, a majority, or even all, of the membranes 42 can be heated by the heating system 20.

As indicated above, following the passage of the incoming air flow in the membranes 42, the outgoing flow of oxygen-depleted air is generated and discharged through the outlet 48 for oxygen-depleted air of the enclosure 40.

As illustrated in FIG. 1, the outlet 48 for depleted air is connected to the fuel tank 12. "Connected to the fuel tank" means that the outgoing air flow of oxygen-depleted air is discharged into the fuel tank 12.

The discharge chain 24 of the outgoing flow of oxygen-depleted air thus connects the separating device 18 to the fuel tank 12.

As illustrated in FIG. 1, the discharge chain 24 for example comprises, from upstream to downstream, an oxygen sensor 66, an air outlet temperature sensor 68, an air outlet pressure sensor 70, a regulating valve 72 for the outgoing flow rate of oxygen-depleted air, an air outlet valve 73.

In a variant, the elements 66, 68, 70, 72, 73 are placed from upstream to downstream in any order. Additionally, each of these elements can be omitted.

The oxygen sensor 66 is configured to measure the oxygen content of the outgoing flow of oxygen-depleted air.

The oxygen sensor 66 makes it possible to verify the proper operation of the separating device 18.

The outlet temperature sensor 68 is configured to measure a temperature of the outgoing flow of oxygen-depleted air.

It is intended to detect an overheating, in order to cut off the heating system 20 and/or to cut off the incoming and outgoing air flow rates.

The outlet pressure sensor 70 is configured to measure a pressure of the outgoing flow of oxygen-depleted air.

The valve 72 regulating the outgoing flow rate of oxygen-depleted air is also able to impose a predetermined flow rate of the outgoing flow of oxygen-depleted air.

This predetermined flow rate of the outgoing flow of oxygen-depleted air in particular depends on the flight phase of the aircraft.

The air outlet valve 73 is able to cut off or allow the outgoing flow of oxygen-depleted air.

The air outlet valve 73 is for example a valve of the ON/OFF type.

Lastly, the inerting system 14 comprises at least one outside temperature sensor 74A, able to measure a temperature of the air outside the enclosure 40.

In a variant or in addition, the inerting system 14 comprises another outside temperature sensor 74B, able to measure a temperature of an outer surface of the heating cover 62.

The processing unit 26 is connected to the heating system 20.

Additionally, the processing unit 26 is connected to the air inlet valve 32, at least one of the air inlet temperature sensors 34A, and the air inlet flow rate sensor 38.

Furthermore, the processing unit 26 is connected to the oxygen sensor 66, the air outlet temperature sensor 68, the air outlet pressure sensor 70, the regulating valve 72 for the outgoing flow rate of oxygen-depleted air and the air outlet valve 73.

The processing unit 26 comprises a processor 76 and at least one memory 78.

The processor 76 is suitable for executing modules contained in the memory 78.

The memory 78 comprises different memory zones.

The memory 78 stores a management module 80 managing the operation of the inerting system 14.

In one example, the management module 80 is made in the form of software stored in the memory 78 and able to be executed by the processor 76. In a variant, the management module 80 is at least partially made in the form of programmable logic components, or in the form of dedicated integrated circuits, included in the inerting system 14.

In still another variant, the management module 80 is able to be executed by another processor of the aircraft.

The management module 80 is advantageously configured to control a heating temperature and/or an electrical power of the heating system 20.

Advantageously, the management module 80 is configured to control the heating system 20 such that the heating temperature is in the range of optimal operating temperatures of the membranes 42.

Furthermore, the management module 80 is configured to cut off the air inlet flow, by means of the air inlet valve 32, if the temperature measured by the outlet temperature sensor is above a predetermined maximum alert temperature.

In addition or in a variant, the management module 80 is configured to cut off the outlet flow of oxygen-depleted air, by means of the air outlet valve 73, if the temperature measured by the outlet temperature sensor 68 is above the predetermined maximum alert temperature.

In addition or in a variant, the management module 80 is configured to cut off the heating of the enclosure 40 by the heating system 20, if the temperature measured by the outlet temperature sensor 68 is above the predetermined maximum alert temperature.

A self-ignition of fuel vapors in the tank 12 can thus be avoided.

Preferably, the management module 80 is configured to control the heating temperature and/or the electrical power of the heating system 20 as a function of a measurement by one of the outside temperature sensors 74A, 74B.

In a variant, or in addition, the management module 80 is configured to control the heating temperature and/or the electrical power of the heating system 20 as a function of the flow rate measured by the incoming air flow rate sensor 38.

A first embodiment of an inerting method will now be described in reference to FIG. 3.

The inerting method comprises providing the inerting system 14 described above.

The air inlet 46 can for example be connected to the engine 16 by the supply chain 22.

The outlet 48 for oxygen-depleted air of the inerting system 14 is connected to the fuel tank 12, for example by the discharge chain 24 described above.

Figure 3:
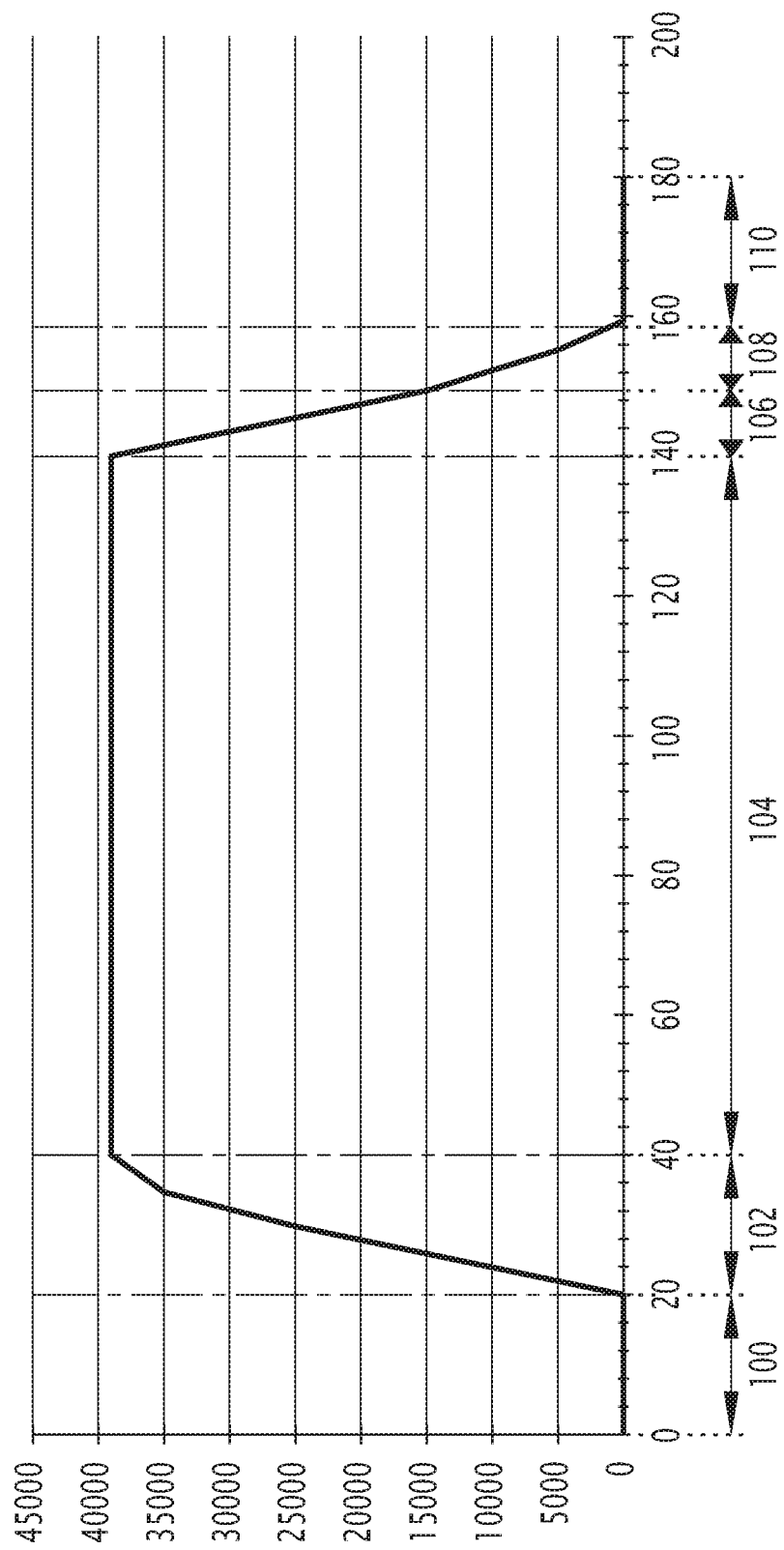
FIG. 3 is a graph of an exemplary mission of an aircraft comprising the inerting system of FIG. 1.

In one exemplary embodiment, the inerting method is implemented during a mission of the aircraft 10, such as the mission illustrated in FIG. 3.

Such a mission typically comprises the following successive phases: a preliminary phase on the ground 100, a climb phase 102, a cruising phase 104, a descent phase 106, an approach phase to the ground 108 and a subsequent phase on the ground 110.

In FIG. 3, the x-axis represents the time, in minutes, from the beginning of the preliminary phase on the ground 100 and the y-axis represents the altitude of the aircraft, in feet.

The altitude of the aircraft 10 during the different phases and the durations of the phases are for example those that can be read in FIG. 3. However, one skilled in the art will understand that these altitudes and durations vary as a function of the mission and are not limiting in the context of the present disclosure.

During the preliminary phase on the ground 100, the method comprises heating said region 58 of the enclosure 40 using the heating system 20.

This heating is in particular carried out by the management module 80.

The management module 80 thus controls a heating temperature of the heating system 20 so that the heating temperature is advantageously in the range of optimal operating temperatures of the membranes 42.

Preferably, no outgoing flow of oxygen-depleted air is injected into the tank, during the preliminary phase on the ground 100.

To that end, the management module 80 controls the air inlet valve 32 in order to cut off the incoming air flow, or the air outlet valve 73 in order to cut off the outgoing flow of oxygen-depleted air.

The heating is thus implemented before any step for generating an outgoing flow of oxygen-depleted air.

As a result, the membranes 42 can be brought to a temperature comprised within the ideal range of operating temperatures before an outgoing flow of oxygen-depleted air is injected into the tank.

The preliminary phase on the ground 100 ends when the aircraft 10 takes off.

During the climb phase 102, the method comprises generating, from the incoming air flow coming from the air inlet 46 of the enclosure 40, the outgoing flow of oxygen-depleted air and discharging it through the outlet 48 for oxygen-depleted air.

The outgoing flow of oxygen-depleted air is thus injected into the fuel tank 12.

This flow generally comprises an oxygen content of less than 12 mol %.

Inasmuch as less oxygen is introduced into the tank, the explosion risks related to the confinement of the fuel are decreased and the inerting of the fuel tank 12 is thus ensured by the inerting system 14.

At the same time, the outgoing flow of oxygen-enriched air generated by the separating device is discharged, through the outlet 50 for oxygen-enriched air, in particular outside the aircraft 10.

The method advantageously comprises heating said region 58 of the enclosure 40 using the heating system 20 at the same time as the step for generating the outgoing flow of oxygen-depleted air.

More specifically, the management module 80 controls the air inlet valve 32 in order to allow the incoming air flow, and the air outlet valve 73 in order to allow the outgoing flow of oxygen-depleted air.

Furthermore, the management module 80 controls the valve 72 regulating the outgoing flow rate of oxygen-depleted air so that the outgoing flow of oxygen-depleted air has a predetermined climb rate.

This climb rate is for example between 1 kg/min and 2 kg/min.

The heating then guarantees good effectiveness of the membranes 42.

The climb phase 102 on the ground ends when the aircraft 10 reaches its cruising altitude.

During the cruising phase 104, the aircraft 10 is kept at a predetermined cruising altitude.

The method comprises heating said region 58 of the enclosure 40 using the heating system 20.

Depending on the type of tank and the configuration of the aircraft, during this cruising phase 104, if the oxygen concentration in the tank stays constant, no outgoing flow of oxygen-depleted air is injected into the tank. Otherwise, an outgoing flow of oxygen-depleted air continues to be injected into the tank to keep this concentration constant during the cruising phase.

In particular, the management module 80 controls the air inlet valve 32 in order to cut off the incoming air flow, or the air outlet valve 73 in order to cut off the outgoing flow of oxygen-depleted air.

The membranes 42 are thus kept at a temperature within their ideal range of operating temperatures, in anticipation of the descent phase 106.

The cruising phase 104 ends when the aircraft 10 begins its descent for landing.

During the descent phase 106, the method comprises generating, from the incoming air flow coming from the air inlet 46 of the enclosure 40, the outgoing flow of oxygen-depleted air and discharging it through the outlet 48 for oxygen-depleted air.

The outgoing flow of oxygen-depleted air is thus injected into the fuel tank 12.

At the same time, the outgoing flow of oxygen-enriched air is discharged, in particular to the outside of the aircraft 10.

The method advantageously comprises heating said region 58 of the enclosure 40 using the heating system 20 at the same time as the step for generating the outgoing flow of oxygen-depleted air.

More specifically, the management module 80 controls the air inlet valve 32 in order to allow the incoming air flow, and the air outlet valve 73 for oxygen-depleted air in order to allow the outgoing flow of oxygen-depleted air.

Furthermore, the management module 80 controls the valve 72 regulating the outgoing flow rate of oxygen-depleted air so that the outgoing flow of oxygen-depleted air has a predetermined descent rate.

Advantageously, the predetermined descent rate is greater than the predetermined climb rate.

The predetermined descent rate is for example between 1.5 kg/min and 4 kg/min.

The descent phase 106 ends when the aircraft 10 begins its approach phase 108.

The approach phase 108 is typically normalized and in particular comprises the landing of the aircraft 10.

This predetermined approach rate is for example between 1 kg/min and 2 kg/min.

During the approach phase 108, the method comprises generating, from the incoming air flow coming from the air inlet 46 of the enclosure 40, the outgoing flow of oxygen-depleted air and discharging it through the outlet 48 for oxygen-depleted air.

The outgoing flow of oxygen-depleted air is thus injected into the fuel tank 12.

At the same time, the outgoing flow of oxygen-enriched air is discharged, in particular to the outside of the aircraft 10.

The method advantageously comprises heating said region 58 of the enclosure 40 using the heating system 20 at the same time as the step for generating the outgoing flow of oxygen-depleted air.

The management module 80 controls the valve 72 regulating the outgoing flow rate of oxygen-depleted air so that the outgoing flow of oxygen-depleted air has a predetermined approach rate.

Advantageously, the predetermined approach rate is less than the predetermined descent rate. The predetermined approach rate is for example equal to the climb rate.

This predetermined approach rate is for example between 1 kg/min and 2 kg/min.

The approach phase 108 ends when the aircraft 10 is on the ground.

During the subsequent phase on the ground 110, the management module 80 commands the stopping of the injection of the outgoing flow of oxygen-depleted air The method for example comprises heating said region 58 of the enclosure 40 using the heating system 20. In a variant, the management module 80 commands the stopping of the heating by the heating system 20.

Advantageously, at least one of the heating steps of the method, and preferably each heating step, comprises the measurement by one of the outside temperature sensors 74A, 74B of the temperature of the air outside the enclosure 40 or of the temperature of the outer surface of the heating cover 62.

The heating step then comprises modifying the heating temperature and/or the electrical power of the electrical heating system as a function of the measurement by the outside temperature sensor 74A, 74B.

The sub-steps for measuring the temperature of the outside air and modification are carried out by the management module 80.

Furthermore, in a variant or in addition, the heating step comprises the measurement by the incoming air flow rate sensor 38 of the flow rate of the incoming air flow.

The heating step comprises modifying the heating temperature and/or the electrical power of the electrical heating system as a function of the measurement by the incoming air flow rate sensor 38.

The sub-steps for measuring the incoming air flow rate and modification are carried out by the management module 80.

Furthermore, in a variant or in addition, during the heating step, the heating system 20 is controlled to a predetermined heating temperature and/or electrical power.

During the discharge of the outgoing flow of oxygen-enriched air, the method comprises measuring the temperature of the outgoing flow of oxygen-depleted air using the outlet temperature sensor 68.

This sub-step for measuring the temperature of the outgoing flow of oxygen-depleted air is advantageously implemented continuously, at regular time intervals.

The method then comprises cutting off the incoming air flow, by means of the air inlet valve 32, if the temperature measured by the outlet temperature sensor 68 is above a predetermined maximum alert temperature.

In addition or in a variant, the method comprises cutting off the outgoing flow of oxygen-depleted air, by means of the air outlet valve 73, if the temperature measured by the outlet temperature sensor 68 is above the predetermined maximum alert temperature.

In addition or in a variant, the method comprises cutting off the heating of the enclosure 40 by the heating system 20, if the temperature measured by the outlet temperature sensor 68 is above the predetermined maximum alert temperature.

These sub-steps for measuring the temperature of the outgoing flow of oxygen-depleted air and cutting off are carried out by the management module 80.

A second embodiment of the method will now be described.

Only the differences between the first method embodiment described above and the second embodiment will be described below.

In the second embodiment of the method, during the preliminary phase on the ground 100, the heating by the heating system 20 is carried out at the same time as a generation of the outgoing flow of oxygen-depleted air.

To that end, the management module 80 controls the air inlet valve 32 in order to allow the incoming air flow, and the air outlet valve 73 in order to allow the outgoing flow of oxygen-depleted air.

In this second embodiment, during the preliminary phase on the ground 100, an outgoing flow of oxygen-depleted air is thus injected into the tank.

In particular, the management module 80 controls the valve 72 regulating the outgoing flow rate of oxygen-depleted air so that the outgoing flow of oxygen-depleted air has a predetermined preliminary flow rate on the ground.

The predetermined flow rate on the ground is for example less than the climb rate and the approach rate.

The preliminary rate on the ground is for example between 0.5 kg/min and 1.5 kg/min.

A third embodiment of the method will now be described.

Only the differences between the method embodiments described above and the second embodiment will be described below.

In the third embodiment of the method, during the cruising phase 104, the heating by the heating system 20 is carried out at the same time as a generation of the outgoing flow of oxygen-depleted air.

To that end, the management module 80 controls the air inlet valve 32 in order to allow the incoming air flow, and the air outlet valve 73 in order to allow the outgoing flow of oxygen-depleted air.

Furthermore, the management module 80 controls the valve 72 regulating the outgoing flow rate of oxygen-depleted air so that the outgoing flow of oxygen-depleted air has a predetermined cruising rate.

The predetermined cruising rate advantageously corresponds to the fuel rate consumed by the engine 16, during the cruising phase 104.

The cruising rate is for example equal to the preliminary rate on the ground.

The cruising rate is for example between 0.5 kg/min and 1.5 kg/min.

The present disclosure applies to various types of tanks, and in particular pressurized or non-pressurized tanks.

In a variant of the inerting system 14 described above, the air inlet flow comes from the cabin or from outside the aircraft.

The inerting system 14 then comprises a compressor able to impose a predetermined pressure for the incoming air flow upstream of the separating device 18, the compressor for example being comprised in the air preparation system 30.

Additionally, in a variant, types of membranes 42 other than those described above can be used.

Owing to the features previously described, it is therefore possible to improve the oxygen depletion of the air distributed in the fuel tank 12 simply and effectively.

Indeed, the heating system 20 makes it possible to decrease the heat losses of at least part of each membrane 42. The oxygen permeability of this part of each membrane 42 is then increased and the oxygen content of the outgoing air flow distributed in the tank is decreased.

As a result, in the case where the incoming air flow comes from the engine 16, a significant engine bleed consumption is not necessary to obtain a good oxygen depletion, inasmuch as the maintained temperature of the membranes 42 is no longer ensured solely by the flow rate of the incoming air flow.

Furthermore, advantageously, the heating system 20 guarantees that at least part of each membrane 42 has an adequate operating temperature.

What is claimed is:

1. An inerting system for an aircraft fuel tank comprising:
    an air separating device, the air separating device comprising an enclosure, the enclosure having at least one air inlet and one outlet for oxygen-depleted air,
    the air separating device being configured to generate, from an air inlet flow coming from the at least one air inlet of the enclosure, an outlet flow of oxygen-depleted air and to discharge the outlet flow of oxygen-depleted air through the at least one outlet for oxygen-depleted air; and
    a heating system outside the enclosure, the heating system being configured to heat at least one region of the enclosure,
    wherein the inerting system further comprises an air entry flow rate sensor arranged and configured to measure a flow rate of the air inlet flow; and a processing unit, the processing unit being configured to control a heating temperature and/or an electric power of the heating system as a function of the flow rate measured by the air entry flow rate sensor.

2. The inerting system according to claim 1, wherein the enclosure extends along a longitudinal axis and contains membranes, each membrane having an oxygen permeability and a nitrogen permeability, the oxygen permeability being different from the nitrogen permeability, at least part of one of the membranes being, in projection on the longitudinal axis, superimposed on the at least one region of the enclosure to be heated by the heating system.

3. The inerting system according to claim 2, wherein each membrane is a tubular membrane extending along the longitudinal axis of the enclosure and, in projection on the longitudinal axis, the at least one region of the enclosure to be heated by the heating system is superimposed on at least 30% of the length of the membranes, or on at least 50% of the length of the membranes, or on at least 80% of the length of the membranes.

4. The inerting system according to claim 1, wherein the enclosure contains membranes, each membrane having an oxygen permeability and a nitrogen permeability, the oxygen permeability being different from the nitrogen permeability, the membranes having an optimal operating temperature range, the inerting system further comprising a processing unit configured to control a heating temperature of the heating system so that the heating temperature is within the optimal operating temperature range.

5. The inerting system according to claim 1, wherein the at least one region of the enclosure to be heated by the heating system extends over at least one zone arranged upstream of a longitudinal middle of the enclosure.

6. The inerting system according to claim 1, wherein the at least one region of the enclosure to be heated by the heating system extends over at least 30% of a circumference of the enclosure.

7. The inerting system according to claim 6, wherein the at least one region of the enclosure to be heated by the heating system extends over at least 50% of the circumference of the enclosure.

8. The inerting system according to claim 7, wherein the at least one region of the enclosure to be heated by the heating system extends over at least 80% of the circumference of the enclosure.

9. The inerting system according to claim 1, wherein the heating system is an electric system and comprises an electric heating member covering the at least one region of the enclosure to be heated by the heating system.

10. The inerting system according to claim 9, the electric heating member is an electric heating cover.

11. The inerting system according to claim 10, further comprising:
    an outside temperature sensor arranged and configured to measure a temperature of the air outside the enclosure or a temperature of an outer surface of the heating cover; and
    a processing unit, the processing unit being configured to control a heating temperature and/or an electric power of the heating system as a function of a measurement by the outside temperature sensor.

12. The inerting system according to claim 1,
    wherein the inerting system further comprises an air entry valve arranged and configured to cut off or allow the air inlet flow; and/or the inerting system further comprises an air outlet valve arranged and configured to cut off or to allow the outlet flow of oxygen-depleted air,
    wherein the inerting system further comprises:
    an outlet temperature sensor configured to measure a temperature of the outlet flow of oxygen-depleted air; and
    a processing unit, the processing unit being configured, if the temperature measured by the outlet temperature sensor is greater than a predetermined maximum alert temperature, to cut off the air inlet flow, via the air inlet valve, and/or to cut off the outlet flow of oxygen-depleted air, via the air outlet valve.

13. The inerting system according to claim 1, further comprising:
an outlet temperature sensor arranged and configured to measure a temperature of the outlet flow of oxygen-depleted air; and
a processing unit, the processing unit being configured to cut off the heating of the enclosure by the heating system, if the temperature measured by the outlet temperature sensor is greater than a predetermined maximum alert temperature.

14. The inerting system according to claim 1, wherein the heating system is an electrical system, the inerting system further comprising an electrical energy supply device configured to supply electrical energy to the processing unit and the heating system.

15. An aircraft comprising:
a fuel tank; and
the inerting system according to claim 1, the outlet for oxygen-depleted air of the inerting system being connected to the fuel tank.

16. The aircraft according to claim 15, further comprising an engine, the air inlet flow coming from the engine.

17. An inerting method comprising:
providing the inerting system according to claim 1;
generating, from an air inlet flow coming from the at least one air inlet of the enclosure, an outlet flow of oxygen-depleted air;
heating at least one region of the enclosure using the heating system, the heating being carried out before and/or at a same time as the generating; and
discharging the outlet flow of oxygen-depleted air through the at least one outlet for oxygen-depleted air.

18. An inerting system for an aircraft fuel tank comprising:
an air separating device, the air separating device comprising an enclosure, the enclosure having at least one air inlet and one outlet for oxygen-depleted air,
the air separating device being configured to generate, from an air inlet flow coming from the at least one air inlet of the enclosure, an outlet flow of oxygen-depleted air and to discharge the outlet flow of oxygen-depleted air through the at least one outlet for oxygen-depleted air; and a heating system outside the enclosure, the heating system being configured to heat at least one region of the enclosure;
wherein the inerting system further comprises an air entry valve arranged and configured to cut off or to allow the air inlet flow; and/or the inerting system further comprises an air outlet valve arranged and configured to cut off or to allow the outlet flow of oxygen-depleted air, wherein the inerting system further comprises:
an outlet temperature sensor configured to measure a temperature of the outlet flow of oxygen-depleted air; and
a processing unit, the processing unit being configured, if the temperature measured by the outlet temperature sensor is greater than a predetermined maximum alert temperature, to cut off the air inlet flow, via the air inlet valve, and/or to cut off the outlet flow of oxygen-depleted air, via the air outlet valve.

19. An inerting system for an aircraft fuel tank comprising:
an air separating device, the air separating device comprising an enclosure, the enclosure having at least one air inlet and one outlet for oxygen-depleted air,
the air separating device being configured to generate, from an air inlet flow coming from the at least one air inlet of the enclosure, an outlet flow of oxygen-depleted air and to discharge the outlet flow of oxygen-depleted air through the at least one outlet for oxygen-depleted air; and a heating system outside the enclosure, the heating system being configured to heat at least one region of the enclosure;
wherein the inerting system further comprises:
an outlet temperature sensor arranged and configured to measure a temperature of the outlet flow of oxygen-depleted air; and
a processing unit, the processing unit being configured to cut off the heating of the enclosure by the heating system, if the temperature measured by the outlet temperature sensor is greater than a predetermined maximum alert temperature.

20. An inerting system for an aircraft fuel tank comprising:
an air separating device, the air separating device comprising an enclosure, the enclosure having at least one air inlet and one outlet for oxygen-depleted air,
the air separating device being configured to generate, from an air inlet flow coming from the at least one air inlet of the enclosure, an outlet flow of oxygen-depleted air and to discharge the outlet flow of oxygen-depleted air through the at least one outlet for oxygen-depleted air; and a heating system outside the enclosure, the heating system being configured to heat at least one region of the enclosure;
wherein the heating system is an electric system and comprises an electric heating cover covering the at least one region of the enclosure to be heated by the heating system;
wherein the inerting system further comprises:
an outside temperature sensor arranged and configured to measure a temperature of the air outside the enclosure or a temperature of an outer surface of the heating cover; and
a processing unit, the processing unit being configured to control a heating temperature and/or an electric power of the heating system as a function of a measurement by the outside temperature sensor.

* * * * *